United States Patent
Ito

(10) Patent No.: US 9,984,074 B2
(45) Date of Patent: May 29, 2018

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Yasushi Ito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 267 days.

(21) Appl. No.: 14/546,335

(22) Filed: Nov. 18, 2014

(65) Prior Publication Data

US 2015/0373088 A1 Dec. 24, 2015

(30) Foreign Application Priority Data

Jun. 24, 2014 (JP) .................................. 2014-129262

(51) Int. Cl.
*G06F 15/16* (2006.01)
*G06F 17/30* (2006.01)

(52) U.S. Cl.
CPC .............................. *G06F 17/30011* (2013.01)

(58) Field of Classification Search
CPC ......... G06F 17/30011; G06F 17/30286; G06F 17/30289; G06F 17/30312; G06F 17/30067; G06F 17/30115; G06F 17/40
USPC .................. 709/201, 202, 203, 212
See application file for complete search history.

(56) References Cited

U.S. PATENT DOCUMENTS

| | | | |
|---|---|---|---|
| 8,005,017 B2 * | 8/2011 | Guan | H04L 45/04 370/254 |
| 8,677,368 B2 * | 3/2014 | Hashimoto | G06F 9/5011 386/293 |
| 8,804,576 B2 * | 8/2014 | Fuse | H04L 12/1831 370/260 |
| 9,418,351 B2 * | 8/2016 | Carr | G06Q 10/087 |
| 2002/0027675 A1 * | 3/2002 | Minato | H04N 1/00214 358/1.15 |
| 2003/0208505 A1 * | 11/2003 | Mullins | G06F 17/30607 |
| 2005/0228853 A1 * | 10/2005 | Yamamura | G06Q 10/10 709/200 |
| 2007/0182982 A1 * | 8/2007 | Hayashida | H04N 1/0035 358/1.14 |
| 2008/0243831 A1 * | 10/2008 | Kunitake | G06F 17/30634 |
| 2008/0244314 A1 * | 10/2008 | Okamura | H04L 12/2825 714/31 |
| 2009/0070348 A1 * | 3/2009 | Uejo | G06F 17/30011 |

(Continued)

FOREIGN PATENT DOCUMENTS

JP 2002-175236 A 6/2002
JP 2003-085076 A 3/2003

*Primary Examiner* — Davoud Zand
(74) *Attorney, Agent, or Firm* — Sughrue Mion, PLLC

(57) ABSTRACT

An information processing apparatus includes a registration unit and a notification unit. The registration unit registers a document onto a designated registration destination if a condition for registration is satisfied when the registration of the document onto the registration destination is requested. The notification unit provides a notification of identification information for identifying the document to multiple destinations if the registration of the document is not performed. When the registration of the document identified based on the identification information notified by the notification unit is requested, the registration unit registers the document onto the registration destination if the condition for the registration is satisfied.

6 Claims, 5 Drawing Sheets

(56) References Cited

U.S. PATENT DOCUMENTS

| | | | | |
|---|---|---|---|---|
| 2010/0313273 A1* | 12/2010 | Freas | ............... | G06F 17/30528 726/26 |
| 2012/0011577 A1* | 1/2012 | Mashimo | ............... | G06F 21/31 726/7 |
| 2014/0310767 A1* | 10/2014 | Nishimura | .............. | H04L 63/20 726/1 |
| 2015/0234787 A1* | 8/2015 | Itamoto | ................ | G06F 17/211 715/204 |

* cited by examiner

TITLE: NOTIFICATION OF RE-REQUEST FOR DOCUMENT REGISTRATION

MESSAGE BODY:
RE-REQUEST ID: 3
DOCUMENT NAME: QUOTATION REQUEST
REGISTRATION DESTINATION: /PURCHASING_PROCESS/CASE_3/
RE-REQUEST RECEPTION URL:
http://kohbai/upload?rid=3

ATTACHED FILE:
QUOTATION_REQUEST.PDF

FIG. 6A

DOCUMENT-REGISTRATION REQUEST MESSAGE
COMMAND: REGISTER
DOCUMENT: QUOTATION_REQUEST.PDF

FIG. 6B

DOCUMENT-REGISTRATION REQUEST MESSAGE
COMMAND: REGISTER
RE-REQUEST ID: 3
DOCUMENT: QUOTATION_REQUEST.PDF

FIG. 7

| IDENTIFICATION INFORMATION (RE-REQUEST ID) | REGISTRATION DESTINATION | CORRESPONDENCE INFORMATION (HASH VALUE) | REGISTRATION STATUS |
|---|---|---|---|
| 1 | /DESIGN/ | 432aa... | REGISTERED |
| 2 | /TEST/ | 5b21e... | UNREGISTERED |
| 3 | /PURCHASING_PROCESS/CASE_3/ | 5b3a1... | UNREGISTERED |
| ... | ... | ... | ... |

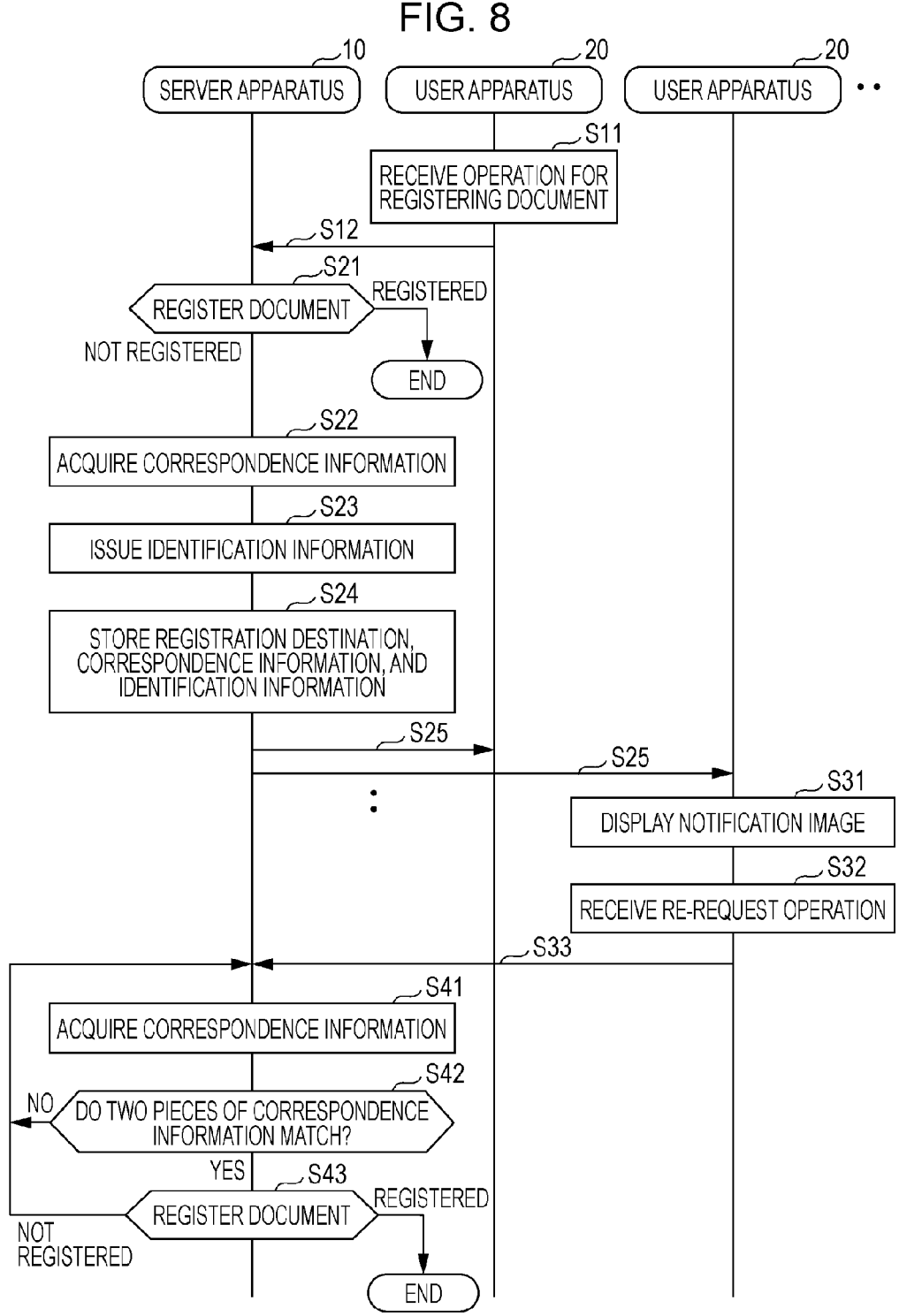

| REGISTRATION DESTINATION | NOTIFICATION DESTINATIONS | | | |
|---|---|---|---|---|
| /DESIGN/ | REQUESTER | aaa@... | bbb@... | - |
| /TEST/ | aaa@... | bbb@... | - | - |
| /PURCHASING_PROCESS/ | REQUESTER | ccc@... | ddd@... | eee@... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-129262 filed Jun. 24, 2014.

BACKGROUND

Technical Field

The present invention relates to information processing apparatuses and non-transitory computer readable media.

SUMMARY

According to an aspect of the invention, there is provided an information processing apparatus including a registration unit and a notification unit. The registration unit registers a document onto a designated registration destination if a condition for registration is satisfied when the registration of the document onto the registration destination is requested. The notification unit provides a notification of identification information for identifying the document to multiple destinations if the registration of the document is not performed. When the registration of the document identified based on the identification information notified by the notification unit is requested, the registration unit registers the document onto the registration destination if the condition for the registration is satisfied.

BRIEF DESCRIPTION OF THE DRAWINGS

An exemplary embodiment of the present invention will be described in detail based on the following figures, wherein:

FIGS. 6A and 6B illustrate examples of messages;

FIG. 7 illustrates an example of a registration-status database;

FIG. 8 illustrates a sequence of a registration process;

DETAILED DESCRIPTION

1. Exemplary Embodiment

1.1. Configuration

Figure 1:
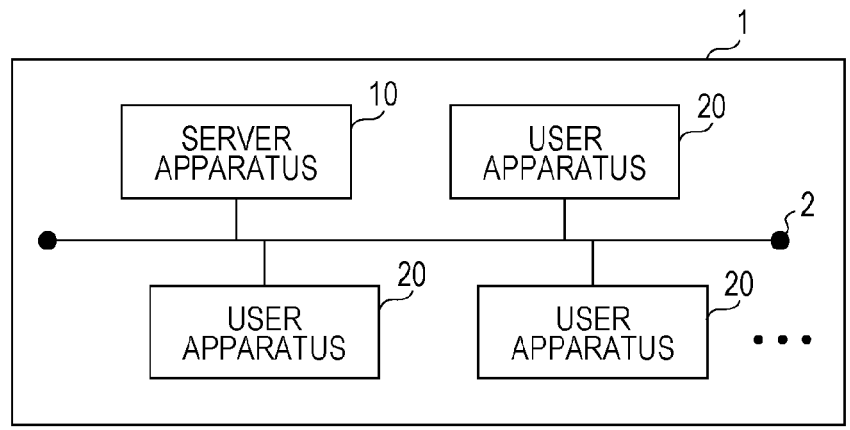
FIG. 1 schematically illustrates an information processing system.

FIG. 1 illustrates the overall configuration of an information processing system 1. The information processing system 1 functions as a so-called document management system that manages electronic documents. The information processing system 1 includes a server apparatus 10, multiple user apparatuses 20, and a communication line 2. The server apparatus 10 has a database for storing documents and manages the documents stored in the database.

The multiple user apparatuses 20 are, for example, personal computers and tablet terminals used by users for utilizing the document management system. For example, each user apparatus 20 has a function for browsing the documents managed by the document management system as well as a function for registering a document. Each user apparatus 20 is connected to the server apparatus 10 via the communication line 2 and exchanges a document with the server apparatus 10. A configuration common among the user apparatuses 20 will be described below.

Figure 2:
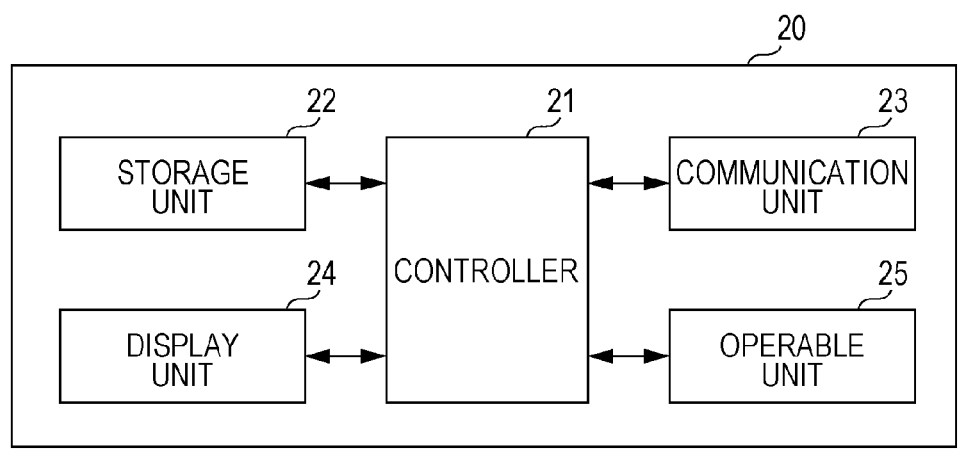
FIG. 2 illustrates a hardware configuration of a user apparatus.

FIG. 2 illustrates a hardware configuration of each user apparatus 20. The user apparatus 20 is an information processing apparatus having a controller 21, a storage unit 22, a communication unit 23, a display unit 24, and an operable unit 25. The controller 21 has a central processing unit (CPU), a random access memory (RAM), and a nonvolatile memory. The controller 21 causes the CPU to execute a program stored in the nonvolatile memory so as to control the operation of each unit. The storage unit 22 is a nonvolatile memory that stores various kinds of programs and data. The communication unit 23 functions as a communication interface that performs data communication via the communication line 2. The display unit 24 includes a display device that displays various kinds of messages. The operable unit 25 has, for example, an operator for operating the user apparatus 20.

Figure 3:
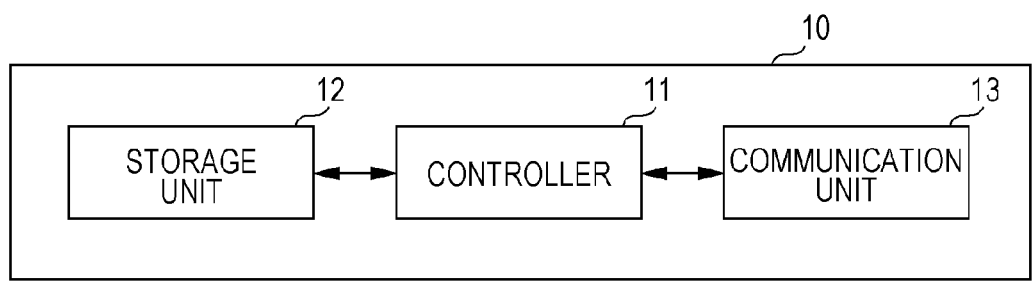
FIG. 3 illustrates a hardware configuration of a server apparatus.

FIG. 3 illustrates a hardware configuration of the server apparatus 10. The server apparatus 10 is an information processing apparatus having a controller 11, a storage unit 12, and a communication unit 13. These units have configurations identical to those of the units of the same names shown in FIG. 2.

Figures 4, 5:
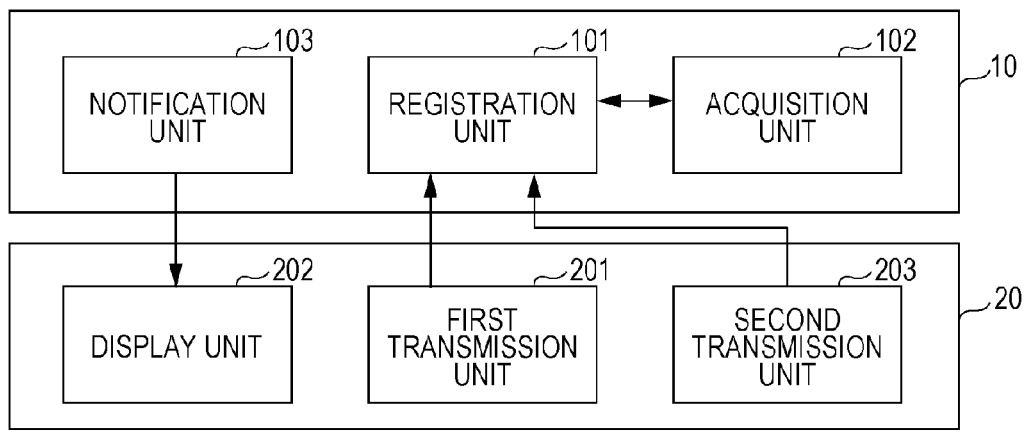
FIG. 4 illustrates a functional configuration of the information processing system.
FIG. 5 illustrates an example of information displayed by a display unit.

The CPU of the controller 11 executes a program stored in the storage unit 12, and the CPU of the controller 21 executes the program stored in the storage unit 22, so that functions shown in FIG. 4 are realized.

FIG. 4 illustrates a functional configuration of the server apparatus 10 and each user apparatus 20. The server apparatus 10 includes a registration unit 101, an acquisition unit 102, and a notification unit 103. The user apparatus 20 includes a first transmission unit 201, a display unit 202, and a second transmission unit 203.

The first transmission unit 201 is configured to transmit a message for requesting registration of a document. For example, it is assumed that the user creates a document in the document management system by operating the user apparatus 20, designates a registration destination, and performs operation for registering the document onto the designated registration destination. For example, the registration destination is expressed by a folder name or a path name (e.g., "/purchasing_process/case_3/") set in the document management system for document classification. When this operation is performed, the first transmission unit 201 transmits, to the server apparatus 10, the created document and a message for requesting registration of the document onto the designated registration destination.

When the registration unit 101 receives the transmitted document and the transmitted message, that is, when the registration unit 101 is requested to register the document onto the designated registration destination, the registration unit 101 registers the document onto the registration destination if a condition for registration is satisfied. The condition for registration includes, for example, a condition in which a storage area in the storage unit 12 of the server apparatus 10 has enough space available for storing the document or a condition in which a predetermined capacity of the storage area has enough space available for storing the document in a case where the user (or, for example, a company to which the user belongs) is permitted to use the predetermined capacity of the storage area set by contract. Alternatively, for example, the condition for registration may include a condition in which a module used for registering the document is properly operating or a condition in which the document does not contain a defect (e.g., the document does not have data of an unexpected format attached thereto) not detected at the time of the registration operation.

If the aforementioned condition is not satisfied, the registration unit 101 does not register the document. For example, if the condition related to the capacity of the storage area is not satisfied, the registration unit 101 determines that the registration is not performed without even attempting to register the document. On the other hand, with regard to the condition related to, for example, the module or the format of the data, it is often difficult to determine whether or not the condition is satisfied without actually attempting to perform the registration. In this case, the registration unit 101 attempts to register the document, and, for example, if the registration of the document is not completed after a predetermined time period (such as 5 minutes or 10 minutes), the registration unit 101 determines that the registration is not performed. In a case where the registration unit 101 determines that the registration is not performed, for example, the registration unit 101 supplies the document requested for registration to the acquisition unit 102 and the notification unit 103.

The acquisition unit 102 acquires information uniquely corresponding to the document (referred to as "correspondence information" hereinafter). In this exemplary embodiment, the acquisition unit 102 acquires a hash value of the document as the correspondence information. For example, when the acquisition unit 102 is supplied with the document from the registration unit 101, the acquisition unit 102 calculates the hash value of the document by using a known hash function, such as a message digest algorithm 5 (MD5). The acquisition unit 102 acquires the calculated hash value as the correspondence information. Alternatively, the acquisition unit 102 may cause an external device to calculate the hash value, and may acquire the calculation result.

In a case where the registration unit 101 does not register the document, the notification unit 103 notifies multiple destinations of identification information for identifying the document. For example, the notification unit 103 issues an identification (ID) constituted of a number or a symbol as identification information for each document. This ID is to be used when re-requesting registration, which will be described later, and will be referred to as "re-request ID" hereinafter. The notification unit 103 stores destinations in correspondence with the respective users using the document management system and provides a notification to a destination stored in correspondence with the user who has made the request for registration of the document. Furthermore, the notification unit 103 also stores a destination for a manager who operates and manages the document management system, and provides a notification to that destination.

These destinations are, for example, electronic mail addresses or unique destinations used in the document management system. In this exemplary embodiment, the notification unit 103 notifies each destination of the non-registered document, a character string indicating re-requesting of registration of that document, and information to be used for the re-requesting together with the re-request ID. In this exemplary embodiment, when the notification unit 103 provides a notification with regard to the non-registered document, the document is deleted from the storage unit (such as the storage unit 12 or the RAM) of the server apparatus 10. This is because the storage capacity of the server apparatus 10 becomes cluttered with documents if all of these kinds of documents are stored therein.

The display unit 202 displays the notification information received from the notification unit 103.

FIG. 5 illustrates an example of information displayed by the display unit 202. In this example, the notification is provided by using an electronic mail message with a title "notification of re-request for document registration". This electronic mail message has a file "quotation_request.pdf", which is the document itself, attached thereto. Furthermore, the body of the message contains a re-request ID, a document name of the non-registered document, a registration destination onto which the document is to be registered, and a uniform resource locator (URL) for receiving the re-request. When the user performs operation for selecting this URL, a browser or a program of the document management system is activated so that a re-requesting process is performed.

The second transmission unit 203 transmits, to the server apparatus 10, a message for re-requesting registration of the document identified based on the identification information notified by the notification unit 103. For example, when the user performs operation for selecting the URL shown in FIG. 5, the second transmission unit 203 transmits, to the server apparatus 10, the message containing the notified re-request ID together with the attached document. Alternatively, for example, the notification information provided when the program in the document management system is activated may be displayed even without the selection of the URL on the electronic mail message, and the second transmission unit 203 may be configured to perform the transmission when this URL is selected.

The message transmitted by the second transmission unit 203 is a message for requesting registration of the document identified based on the identification information notified by the notification unit 103. This message is received by the registration unit 101. A difference between the message transmitted by the first transmission unit 201 (referred to as "first message" hereinafter) and the message transmitted by the second transmission unit 203 (referred to as "second message" hereinafter) will be described below.

FIG. 6A illustrates an example of the first message. The first message indicates that the command (indicating the contents of the request) is "register" and the document is "quotation_request.pdf". The first message does not contain a "re-request ID". A document registration request based on this first message will be referred to as "first request".

FIG. 6B illustrates an example of the second message. The second message indicates that the command is "register", the re-request ID is "3", and the document is "quotation_request.pdf". When the registration unit 101 receives this second message, that is, when there is a request for registration of the document identified based on the identification information notified by the notification unit 103, the registration unit 101 registers this document onto the registration destination at the time of the first request described above if the condition for registration is satisfied.

If the correspondence information acquired with respect to the document requested for registration prior to the notification by the notification unit 103 matches the correspondence information acquired with respect to the document requested for registration after the notification, the registration unit 101 performs the above-described registration (in this case, the registration is performed if the condition for registration is satisfied). In order to determine whether the registration destinations match or the two pieces of correspondence information match, the registration unit 101 uses, for example, a registration-status database (DB) indicating, for example, a document registration status.

FIG. 7 illustrates an example of the registration-status DB. The registration-status DB stores therein identification information (i.e., a re-request ID in this exemplary embodiment), a registration destination, correspondence information (i.e., a hash value in this exemplary embodiment), and a registration status. For example, when the registration unit 101 does not register a document, the registration unit 101 stores a "registration destination" therefor into the registration-status DB. At this point, the registration status automatically becomes "unregistered". The notification unit 103 provides the above-described notification and also stores an issued re-request ID in correspondence with the registration destination of the document for which the re-request ID is issued.

The acquisition unit 102 stores a hash value acquired with respect to the document supplied from the registration unit 101 in correspondence with the registration destination of that document. Accordingly, the server apparatus 10 stores the registration destination of the non-registered document, the identification information, and the correspondence information. In the example shown in FIG. 7, with regard to the "unregistered" document for which the information shown in FIG. 5 is notified, a re-request ID "3", a registration destination "/purchasing_process/case_3/", and a hash value "5b3a1 . . . " are stored in correspondence with one another.

When the registration unit 101 receives the second message shown in FIG. 6B, the registration unit 101 first supplies, to the acquisition unit 102, the document "quotation_request.pdf" transmitted together with the second message. The acquisition unit 102 acquires the hash value of the supplied document as the correspondence information and supplies the hash value to the registration unit 101. The registration unit 101 determines whether or not the supplied hash value matches the hash value stored in the registration-status DB in correspondence with the re-request ID "3" contained in the second message.

When the registration unit 101 determines that these hash values match, the registration unit 101 registers the document "quotation_request.pdf" onto the registration destination (in this case, "/purchasing_process/case_3/") stored in the registration-status DB in correspondence with the re-request ID "3" if the condition for registration is satisfied, as in the above-described case.

1.2. Operation

Each of the apparatuses included in the information processing system 1 performs a registration process for registering a document.

FIG. 8 illustrates a sequence of the registration process. In FIG. 8, two of the multiple user apparatuses 20 are shown. The registration process starts when a user operates one of the multiple user apparatuses 20 for designating a registration destination and for registering a document. When the user apparatus 20 receives this operation in step S11, the user apparatus 20 transmits the first message shown in FIG. 6A to the server apparatus 10 in step S12. Step 12 is performed by the first transmission unit 201.

When the server apparatus 10 receives the first message, the server apparatus 10 registers the document in step S21 if the above-described condition for registration is satisfied. When the server apparatus 10 registers the document, the registration process ends. If the condition is not satisfied and the server apparatus 10 does not register the document ("NOT REGISTERED"), the server apparatus 10 acquires correspondence information (i.e., a hash value in this exemplary embodiment) of the document in step S22 and issues identification information (i.e., a re-request ID in this exemplary embodiment) of the document in step S23. Step S22 is performed by the acquisition unit 102. As shown in FIG. 7, the server apparatus 10 stores the registration information, the correspondence information, and the identification information in step S24. In step S25, the server apparatus 10 notifies multiple destinations of the identification information and the various kinds of information shown in FIG. 5. Steps S23 and S25 are performed by the notification unit 103.

In FIG. 8, a second user different from the user having performed the operation for document registration is performing re-requesting operation. The user apparatus 20 of the second user displays notification information in step S31 and receives the operation for re-requesting document registration performed by the second user in step S32. In step S33, the user apparatus 20 transmits the second message shown in FIG. 6B together with the document to the server apparatus 10. Step S31 is performed by the display unit 202, and steps S32 and S33 are performed by the second transmission unit 203.

When the server apparatus 10 receives the second message, the server apparatus 10 acquires correspondence information of the document received together with the second message in step S41 and determines in step S42 whether or not the acquired correspondence information matches the correspondence information acquired in step S22. Step S41 is performed by the acquisition unit 102. If the server apparatus 10 determines that the two pieces of correspondence information do not match (NO), the server apparatus 10 returns to the state prior to the reception of the second message (i.e., the state prior to step S33). If the server apparatus 10 determines that the two pieces of correspondence information match (YES), the server apparatus 10 registers the document in step S43 if the condition for registration is satisfied. Steps S42 and S43 are performed by the registration unit 101. When the server apparatus 10 registers the document in step S43, the registration process ends. If the document is not registered in step S43, the server apparatus 10 returns to the state prior to the reception of the second message.

In this exemplary embodiment, as described above, when a document is not registered, multiple users receive a notification for re-requesting registration of the document. Thus, when registration of the document requested for registration is not performed, other users are also notified so that the possibility in which re-requesting of registration is performed is increased, as compared with, for example, a case where only the user who has made the request (i.e., one destination) is notified, whereby registration of the document may be more reliably performed. Moreover, since the document is registered when hash values, which are correspondence information, match, registration of a document different from the non-registered document may be prevented.

2. Modifications

The above exemplary embodiment is only an example of an exemplary embodiment of the present invention and may be modified as follows. The above exemplary embodiment and modifications to be described below may be combined, where appropriate.

2.1. User Apparatus

Each of the user apparatuses 20 is not limited to that described above and may be, for example, a smartphone, a notebook-type personal computer, or an apparatus shared by multiple users, such as an image reading apparatus or an image forming apparatus. In the case of an image reading apparatus, the image reading apparatus may conceivably be used such that, for example, when the image reading apparatus reads a paper document and converts it into an electronic document, registration of the electronic document is requested. In the case of an image forming apparatus, the image forming apparatus may conceivably be used such that the image forming apparatus outputs notification information provided by the notification unit 103 onto a medium, such as paper, so as to notify the users.

2.2. Correspondence Information

The correspondence information is not limited to a hash value. For example, the acquisition unit 102 may acquire a document size, a document renewed time, or a document created time as the correspondence information. With regard to the document size, the matching possibility between different documents decreases if they are compared in units of, for example, 1 byte. The document renewal time inevitably changes when a user edits the document. In a case of a document that is non-editable once it is created, if the created time thereof is different, it is apparent that the document is a different document. Therefore, even when one of these pieces of information is used as the correspondence information, registration of a document different from a non-registered document may be prevented.

2.3. Comparison of Correspondence Information

When comparing the above-described two pieces of correspondence information, there are a case where the registration unit 101 does not permit a difference therebetween altogether and a case where the registration unit 101 may permit a difference therebetween to some extent. For example, it is assumed that a user requests registration of an electronic document converted from a paper document, and the electronic document and a document notified from the server apparatus 10 are both deleted due to some circumstances. In this case, if the paper document remains and the document size is used as the correspondence information, re-requesting of registration may be performed by using an electronic document obtained again by being converted from the paper document. Because the size of the electronic document slightly changes even though the documents are identical, the registration unit 101 may determine that the two pieces of correspondence information match even if there is a slight difference (of, for example about several bytes to several tens of bytes) therebetween.

2.4. Notification Destinations

The notification unit 103 may select destinations based on a method different from that in the above exemplary embodiment. For example, the notification unit 103 provides a notification to destinations in accordance with a registration destination. The notification unit 103 stores a destination table in which a registration destination and notification destinations are stored in correspondence with each other.

Figures 9, 10, 11:
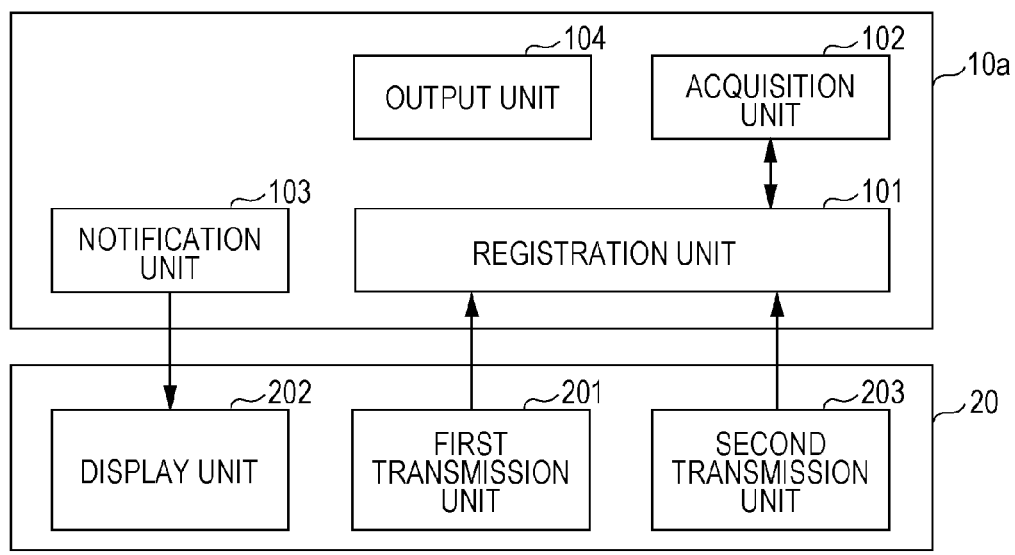
FIG. 9 illustrates an example of a destination table.
FIG. 10 illustrates a functional configuration of a server apparatus according to a modification.
FIG. 11 illustrates an example of an output list.

FIG. 9 illustrates an example of the destination table. In this example, a registration destination "/design/" is stored in correspondence with notification destinations "requester", "aaa@ . . . ", and "bbb@ . . . ". The "requester" indicates a destination stored in correspondence with a user requesting document registration. A registration destination "/test/" is stored in correspondence with notification destinations "aaa@ . . . " and "bbb@ . . . ". A registration destination "/purchasing_process/" is stored in correspondence with notification destinations "requester", "ccc@ . . . ", "ddd@ . . . ", and "eee@ . . . ".

For example, if registration onto the registration destination "/purchasing_process/case_3/" shown in FIG. 5 is not performed, the notification unit 103 provides a notification to the four destinations stored in correspondence with "/purchasing_process/". Accordingly, the destinations may or may not include the requester. Furthermore, the number of destinations may be changed in accordance with each registration destination. However, the notification unit 103 provides a notification to at least two destinations.

In the document management system, a registration destination is often individually set for each type or property of a document to be registered. For example, the registration destination "/purchasing_process/" has a document related to purchasing business registered thereto. In the case of such a document, it is easier to raise awareness by providing a notification to users related to purchasing business than to users not related to such business, and the possibility in which re-requesting of registration is performed also increases. Therefore, registration of the document may be more reliably performed.

Alternatively, the notification unit 103 may provide a notification to destinations in accordance with a time frame or a period. For example, the notification unit 103 provides a notification to destinations of users working on dayshift during a daytime frame, and provides a notification to destinations of users working on nightshift during a nighttime frame. Furthermore, for example, since it makes users difficult to check a notification and perform re-requesting operation during a busy period, the number of notification destinations may be increased as compared with other periods, so that the possibility in which re-requesting operation is performed may be increased as much as possible. In either case, it is desirable that a notification be provided to destinations such that the possibility in which re-requesting of registration is performed is increased as much as possible. Thus, registration of a document may be more reliably performed, as compared with a case where the notification destinations are fixed.

2.5. Output of List

In order to prepare for a case where re-requesting of registration is not immediately performed, for example, the manager of the server apparatus may be prompted to make a re-request. In that case, it is convenient if the manager is able to easily ascertain an unregistered document.

FIG. 10 illustrates a functional configuration of a server apparatus 10a according to a modification. The server apparatus 10a includes an output unit 104 in addition to the units shown in FIG. 4. The output unit 104 outputs a list of identification information. An output destination for this list may be, for example, a display unit connected to the server apparatus 10a or a personal computer used for business by the manager.

FIG. 11 illustrates an example of the output list. In FIG. 11, a list A1 including three pieces of identification information, namely, re-request IDs 3, 4, and 5, is shown. In addition to the identification information, the list A1 includes file names and registration destinations of corresponding documents. The list A1 may additionally or alternatively include, for example, time points at which requests for registration are made, usernames having made the requests for registration, corresponding notification destinations, and usernames or division names corresponding to the destinations.

The list A1 also includes radio buttons corresponding to the respective pieces of identification information, and an operator B1 for providing a notification of identification information selected by each radio button. When a user operates the operator B1 in the state shown in FIG. 11, the selected re-request IDs 3 and 4 are supplied to the notification unit 103. The notification unit 103 provides a notification to the destinations corresponding to the supplied re-request IDs (i.e., identification information). Thus, the notification unit 103 according to this modification provides a notification of identification information selected by the user from among the multiple pieces of identification information included in the output list.

According to this modification, since a list of unregistered documents as shown in FIG. 11 may be ascertained, a measure for registering the unregistered documents may be readily taken, as compared with a case where such a list is not output. Furthermore, by providing a notification of selected identification information, a measure for registering the unregistered documents may be readily taken, as compared with a case where such a notification is not provided.

2.6. Notification of Registration

The notification unit 103 may notify related users of successful registration. Specifically, when the registration unit 101 registers a document identified based on identification information notified by the notification unit 103, the notification unit 103 notifies the destinations notified of the identification information that the document has been registered. Thus, re-requesting of registration of an already-registered document may be suppressed, as compared with a case where a notification of successful registration is not provided.

When this notification is provided, each user apparatus may delete the previous notification information (such as the identification information and the document) related to the document for which the notification is provided (that is, the registered document). Thus, re-requesting of registration of an already-registered document may be further suppressed, as compared with a case where such deletion is not performed.

2.7. Changing of Notification Destinations

The destinations to be notified of identification information may be changed. For example, a certain user may make the aforementioned first request (i.e., a request for registration of a document based on the first message) multiple times with respect to the same document. This may conceivably be due to the user not checking his/her electronic mail set as a destination very often or the user not being a subject for notification. In this case, although requesting of registration is performed multiple times so that the possibility of the document becoming registered increases, a notification of identification information is provided multiple times. This may be annoying for users set as destinations, possibly resulting in the users not checking the notification.

In this modification, if there is a document for which registration is not performed a predetermined number of times or more by the registration unit 101, the notification unit 103 changes the destinations to be notified of the identification information of the document. For example, the notification unit 103 changes the notification destinations only to the destination corresponding to the user having made the first request. Thus, the number of times other users are notified is reduced in a case where, for example, the first request is made multiple times as described above. Furthermore, if there is a document for which registration is not performed a predetermined number of times or more, the notification unit 103 may change the notification destinations so as to provide a notification to other additional destinations. In that case, the number of notification destinations is increased so that the possibility of the document becoming registered may be increased. Accordingly, the notification unit 103 changes the destinations in the above-described manner so as to adjust the number of notifications in accordance with the situation.

2.8. Contents of Notification

The contents to be notified by the notification unit 103 are not limited to those shown in FIG. 5. For example, instead of providing a notification of a document itself, a notification of information for acquiring the document may be provided. If the document is stored in, for example, a file server, the notification unit 103 provides a notification of information indicating a path therefor. Furthermore, although a document notified by the notification unit 103 is immediately deleted in the above exemplary embodiment, the server apparatus 10 may store the document for a predetermined period (such as 1 day or 1 week) after the notification, and the notification unit 103 may provide a notification of information, such as URL, indicating the stored location. In that case, the server apparatus 10 deletes the document from the storage unit of the server apparatus 10 after the period.

If a re-request is made during the period in which the document is stored, the document does not have to be contained in the aforementioned second message (i.e., a message used for re-requesting). In this case, the user apparatus 20 transmits the second message at least containing the identification information notified by the notification unit 103, and the server apparatus 10 reads the stored document identified based on the identification information and registers the document if the condition is satisfied. Furthermore, in this case, the notification from the server apparatus 10 does not have to contain the document. Thus, communication load may be reduced, as compared with a case where the document is contained in the notification or the message. Furthermore, since duplicates of the document may be prevented from spreading, the notification based on this method is desired for a highly-confidential document.

Data storage may be performed by an external apparatus that is separate from the server apparatus 10 and that is provided for data exchange. Furthermore, if a notification of the document itself is to be provided, when the same destination is to be notified again of the identification information of the same document, a notification of the document does not have to be provided (since the notification of the document has already been provided).

Furthermore, although identification information (i.e., a re-request ID) and correspondence information (i.e., a hash value) are separate pieces of information in the above exemplary embodiment, correspondence information may alternatively be used as identification information. Since correspondence information is information uniquely corresponding to a document, correspondence information may be used as information for identifying a document.

2.9. Automatic Request by User Apparatus

Each user apparatus 20 may automatically perform re-requesting of registration even when there is no operation performed by the user. In this modification, when the second transmission unit 203 shown in FIG. 4 is notified of identification information from the notification unit 103, the second transmission unit 203 transmits, to the server apparatus 10, a message for requesting registration of a document identified based on the identification information at a predetermined timing. The second transmission unit 203 is an example of a "transmission unit" according to an exemplary embodiment of the present invention. The predetermined timing may be, for example, a predetermined time interval (such as every hour) or a predetermined time (such as every day at midnight). Furthermore, the timing may be changed by performing the transmission every hour for the first predetermined number of times and then performing the transmission every two hours thereafter. Moreover, the transmission may be terminated after the message is transmitted a predetermined number of times (such as five times or ten times). In this modification, re-requesting of registration may be reliably performed. As a result, the possibility of the document becoming registered may be increased, as compared with a case where automatic re-requesting is not performed.

2.10. Registration of Document

Although registration of a document is performed in the document management system in the above exemplary embodiment, for example, a posting onto a bulletin board system or a social networking service (SNS) may also be considered as registration of a document. In other words, registration of a document refers to storing a document (which includes a posting and does not necessarily have to be actually browsed) assumed to be browsed by other users at a location where the document may be browsed by these users. The users who are able to browse the registered document and the time period in which the users are able to browse the registered document may be limited. Furthermore, the location where the document is stored is not limited to the storage unit of the server apparatus 10. Specifically, the location may alternatively be an external storage unit, and the hardware may be of any type.

2.11. User Authorization

Although there is no specific description regarding user authorization in the above exemplary embodiment, authorization for registering a document may sometimes be necessary. In that case, for example, it is conceivable that an unauthorized user may receive a notification and make a re-request for registration. Since a request for registration is made with respect to a document requested for registration by an authorized user to begin with, the registration unit 101 registers the document regardless of whether or not the user who has made the re-request is authorized. Consequently, even when the document corresponds to a small number of users authorized for registration, the possibility of the document becoming registered may be increased, as in the above exemplary embodiment.

2.12. Situation Where Registration is Requested

In the above exemplary embodiment, when registration of a document identified based on identification information notified by the notification unit 103 is requested, the registration unit 101 simply registers the document onto a registration destination if the condition for registration is satisfied. Alternatively, the document may be registered in a situation where the registration is requested prior to the notification provided by the notification unit 103. The term "situation" here refers to, for example, a time at which the registration is requested or a person who has made the request for registration. Thus, in the document management system realized by the information processing system 1, a document registered in response to a re-request is treated as a document registered at the time of a first request. In other words, even when the situation has changed at the time of a re-request, the situation where registration is requested the first time is ascertained. In this modification, the notification unit 103 may provide a notification to one destination. Even in that case, the point in which the situation where registration is requested the first time is ascertained is the same.

More specifically, if the condition for registration is not satisfied, the registration unit 101 registers the identification information for identifying the document and information (which will be referred to as "situation information" hereinafter) indicating a situation where a request is made (such as a time or a registration requester). Accordingly, when registration of the document is not performed, the notification unit 103 notifies a destination (which may be a single destination or multiple destinations) of the identification information for identifying the document. When there is a request for registration of the document identified based on the identification information notified by the notification unit 103, the registration unit 101 registers the document in correspondence with the situation information if the condition for registration is satisfied. In this case, the registration unit 101 registers the contents at the time of the registration without changing the situation information. By registering the situation information in this manner, the document registered in response to a re-request may be readily treated as a document registered in a situation where the registration is requested prior to the notification provided by the notification unit 103, as compared with a case where the situation information is not registered.

For example, it is assumed that a situation indicating the person who has requested registration of the document is used. On the other hand, a destination to be notified by the notification unit 103 may sometimes include a destination other than the request source that has requested registration (or the destination other than the request source may be set as the destination). In that case, a re-request for registration of the document is made by a user other than the request source. In this modification, even when the person who has made the re-request for registration is different from the person who has made the request for registration the first time, the document is registered with the name of the person who has made the request the first time, so that the document is treated as being registered by that person. Thus, for example, even when registration is unsuccessful due to a system failure, the document is registered after the system failure is eliminated without forcing the person who has made the request the first time to perform an additional process. If the person who has made the re-request for registration is different from the person who has made the request the first time in this manner, requesting of access authorization may be not performed.

2.13. Category of Present Invention

The present invention is regarded as an information processing apparatus, such as a server apparatus, an information processing apparatus including a server apparatus and a user apparatus, and an information processing method for realizing a process performed by these apparatuses. Furthermore, the present invention is also regarded as a program that causes a computer, such as each of the above apparatuses, to function as each of the above units. For example, this program is provided in the form of a storage medium, such as an optical disk, storing the program or is provided and used by being downloaded and installed into a computer via a network, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management server comprising:
a memory that stores computer-readable instructions; and
a processor configured to execute the computer-readable instructions, which when executed cause the document management server to:
receive a first request to store an electronic document to a storage location managed by the document management server;
store the electronic document to the storage location based on a request and a storage condition;
transmit, when the electronic document is not stored to the storage location because of the storage condition, a storage failure notification message that indicates 1) the document is not stored to the storage location, 2) document identification information of the electronic document and 3) storage identification information of the storage location; and
receive a second request to store the electronic document to the storage location again using the storage failure notification message,
wherein the processor when executing the computer-readable instructions is further configured to:
generate a document signature of the electronic document uniquely corresponding to the electronic document, in response to receiving the first request;
store the document signature of the electronic document in a database in association with the document identification information of the electronic document;
compare the document signature of the electronic document stored in the database with a document signature of the electronic document in the second request; and
store the electronic document to the storage location associated with the document identification information of the electronic document in a table of the database in response to determining that the document storage condition is satisfied and that the document signature of the electronic document matches the document signature of the electronic document in the second request.

2. The document management server according to claim 1, wherein the document signature of the electronic document stored in the database comprises a hash value of the electronic document.

3. A document management method of a document management server, the method comprising:
receiving a first request to store an electronic document to a storage location managed by the document management server;
storing the electronic document to the storage location based on a request and a storage condition;
transmitting, when the electronic document is not stored to the storage location because of the storage condition, a storage failure notification message that indicates 1) the document is not stored to the storage location, 2) document identification information of the electronic document and 3) storage identification information of the storage location;
receiving a second request to store the electronic document to the storage location again using the storage failure notification message;
generating a document signature of the electronic document uniquely corresponding to the electronic document, in response to receiving the first request;
storing the document signature of the electronic document in a database in association with the document identification information of the electronic document; and
comparing the document signature of the electronic document stored in the database with a document signature of the electronic document in the second request, and
wherein the storing the electronic document comprises storing the electronic document to the storage location associated with the document identification information of the electronic document in a table of the database, in response to determining that the document storage condition is satisfied and that the document signature of the electronic document matches the document signature of the electronic document in the second request.

4. The document management method according to claim 3, wherein the document signature of the electronic document stored in the database comprises a hash value of the electronic document.

5. A non-transitory computer-readable recording medium having embodied thereon computer-readable instructions, which when executed by a computer cause the computer to execute a document management method of a document management server, the method comprising:
receiving a first request to store an electronic document to a storage location managed by the document management server;
storing the electronic document to the storage location based on a request and a storage condition;
transmitting, when the electronic document is not stored to the storage location because of the storage condition, a storage failure notification message that indicates 1) the document is not stored to the storage location, 2) document identification information of the electronic document and 3) storage identification information of the storage location;

receiving a second request to store the electronic document to the storage location again using the storage failure notification message;

generating a document signature of the electronic document uniquely corresponding to the electronic document, in response to receiving the first request;

storing the document signature of the electronic document in a database in association with the document identification information of the electronic document; and comparing the document signature of the electronic document stored in the database with a document signature of the electronic document in the second request, and wherein the storing the electronic document comprises storing the electronic document to the storage location associated with the document identification information of the electronic document in a table of the database, in response to determining that the document storage condition is satisfied and that the document signature of the electronic document matches the document signature of the electronic document in the second request.

6. The non-transitory computer-readable recording medium according to claim 5, wherein the document signature of the electronic document stored in the database comprises a hash value of the electronic document.

* * * * *